United States Patent
Jo et al.

(10) Patent No.: US 12,403,770 B2
(45) Date of Patent: Sep. 2, 2025

(54) ENGAGEMENT STRUCTURE OF SUB-FRAME OF VEHICLE FOR AVOIDING COLLISION BETWEEN BATTERY AND SUB-FRAME

(71) Applicants: Hyundai Motor Company, Seoul (KR); Kia Corporation, Seoul (KR)

(72) Inventors: Gi-Bong Jo, Seoul (KR); Chul-Woo Kwak, Hwaseong-si (KR); Hyun-Mo Yang, Suwon-si (KR); Hee-Jun Hwang, Seoul (KR)

(73) Assignees: Hyundai Motor Company, South (KR); Kia Corporation, South (KR)

(*) Notice: Subject to any disclaimer, the term of this patent is extended or adjusted under 35 U.S.C. 154(b) by 373 days.

(21) Appl. No.: 17/955,166

(22) Filed: Sep. 28, 2022

(65) Prior Publication Data

US 2023/0202302 A1    Jun. 29, 2023

(30) Foreign Application Priority Data

Dec. 23, 2021   (KR) .......................... 10-2021-0185946

(51) Int. Cl.
| | |
|---|---|
| *B60L 3/00* | (2019.01) |
| *B60K 1/04* | (2019.01) |
| *B60L 50/64* | (2019.01) |
| *B62D 21/15* | (2006.01) |
| *B62D 25/20* | (2006.01) |

(52) U.S. Cl.
CPC .............. *B60L 3/0007* (2013.01); *B60K 1/04* (2013.01); *B60L 50/64* (2019.02); *B62D 21/15* (2013.01); *B62D 25/20* (2013.01); *B60K 2001/0438* (2013.01)

(58) Field of Classification Search
CPC ........ B60L 3/0007; B60L 50/64; B60L 50/66; B60K 1/04; B60K 2001/0438; B62D 21/15; B62D 25/20; B62D 21/155; B62D 27/065; B62D 21/11; B60Y 2306/01
See application file for complete search history.

(56) References Cited

U.S. PATENT DOCUMENTS

| | | | | |
|---|---|---|---|---|
| 9,422,007 | B2* | 8/2016 | Suzuki | B62D 21/155 |
| 10,703,313 | B2* | 7/2020 | Uchiba | B62D 25/08 |
| 11,027,618 | B2* | 6/2021 | Kamikihara | B60L 50/64 |
| 11,161,401 | B2* | 11/2021 | Lian | B60K 1/00 |
| 11,161,549 | B2* | 11/2021 | Sakai | B62D 21/07 |

(Continued)

FOREIGN PATENT DOCUMENTS

| | | | | |
|---|---|---|---|---|
| CN | 109421818 A | * | 3/2019 | ............... B60K 1/04 |
| CN | 112793423 A | * | 5/2021 | ............... B60K 1/04 |

(Continued)

OTHER PUBLICATIONS

Translated CN-109421818-A (Year: 2025).*
Translated DE-102017011778-A1 (Year: 2025).*

*Primary Examiner* — James A Shriver, II
*Assistant Examiner* — Ian Bryce Shelton
(74) *Attorney, Agent, or Firm* — Slater Matsil, LLP

(57) ABSTRACT

An embodiment engagement structure includes an engagement bracket including an upper end configured to be engaged with a side member of a vehicle and connected to a region in which the side member is to be engaged with a sub-frame, wherein the engagement bracket comprises an inclined portion inclined downward toward a rear side of the vehicle.

20 Claims, 8 Drawing Sheets

(FRONT SIDE)

(56) References Cited

U.S. PATENT DOCUMENTS

| | | | | |
|---|---|---|---|---|
| 11,173,776 | B2* | 11/2021 | Sasaki | B60K 1/04 |
| 11,241,948 | B2* | 2/2022 | Morimoto | B62D 25/08 |
| 11,524,726 | B2* | 12/2022 | Fujisawa | B60K 1/04 |
| 2019/0106072 | A1* | 4/2019 | Uchiba | B60R 19/34 |
| 2019/0322164 | A1* | 10/2019 | Sasaki | B62D 21/155 |
| 2020/0086928 | A1* | 3/2020 | Morimoto | B62D 25/20 |
| 2020/0102014 | A1* | 4/2020 | Sakai | B62D 21/07 |
| 2020/0148050 | A1* | 5/2020 | Lian | B62D 21/155 |
| 2020/0156485 | A1* | 5/2020 | Kamikihara | B62D 21/11 |
| 2020/0156706 | A1* | 5/2020 | Morimoto | B62D 25/2027 |
| 2021/0107571 | A1* | 4/2021 | Fujisawa | B62D 25/2036 |

FOREIGN PATENT DOCUMENTS

| | | | | |
|---|---|---|---|---|
| DE | 102016000755 | A1* | 8/2016 | B62D 21/152 |
| DE | 102017011778 | A1* | 8/2018 | B62D 21/15 |
| KR | 20190070748 | A | 6/2019 | |

* cited by examiner

ENGAGEMENT STRUCTURE OF SUB-FRAME OF VEHICLE FOR AVOIDING COLLISION BETWEEN BATTERY AND SUB-FRAME

CROSS-REFERENCE TO RELATED APPLICATIONS

This application claims the benefit of Korean Patent Application No. 10-2021-0185946, filed on Dec. 23, 2021, which application is hereby incorporated herein by reference.

TECHNICAL FIELD

Exemplary embodiments of the present disclosure relate to an engagement structure of a sub-frame for avoiding a collision between a battery and the sub-frame.

BACKGROUND

Due to the electrification of vehicles, the spread of electric vehicles using driving motors as power sources instead of internal combustion engines is expanding.

In order to increase a cruising distance (a distance capable of traveling after maximum charging) of such an electric vehicle, a high-capacity battery should be mounted in the electric vehicle. Generally, in the electric vehicle, a bottom surface of the electric vehicle is used as a space for mounting the battery. The battery is mounted in a large area on the bottom surface of the electric vehicle, and thus a capacity of the battery is increased to increase the cruising distance.

However, since the battery is mounted on the bottom surface of the electric vehicle, when the vehicle undergoes a head-on collision, an offset collision, or a small overlap collision, the sub-frame of the electric vehicle is separated from the vehicle body due to an impact and pushed rearward. In this case, the sub-frame strikes the battery.

As shown in FIGS. 1 to 3, a sub-frame 120 is engaged with a side member no. A stud 136 is welded to the side member no and the sub-frame 120 is engaged with the stud 136 by bolts. In this case, an engagement bracket 130 is applied between the side member no and the sub-frame 120. However, the engagement bracket 130 is formed to surround only the stud 136 and is bonded to the bottom surface of the side member 110.

Accordingly, when the vehicle collides, the sub-frame 120 is pushed to a rear side to strike a battery 141. When the battery 141 is damaged, a fire may occur. In order to prevent the fire from occurring, a protector 142 is installed at a front end of the battery 141, and a space S capable of absorbing the pushing of the sub-frame 120 is secured between the protector 142 and the sub-frame 120.

For application of the protector 142 and securing of the space S which absorbs the pushing of the sub-frame 120, it is necessary to reduce a size of the battery 141, and thus the cruising distance is reduced so that there is a problem in that marketability is degraded.

On the other hand, in order to implement a structure in which the sub-frame 120 is not separated from the side member 110, it is difficult to apply a bush to an engagement portion between the side member no and the sub-frame 120. However, when the bush is not applied, ride & handling (R&H) performance and noise, vibration, harshness (NVH) performance of the electric vehicle are degraded.

SUMMARY

Exemplary embodiments of the present disclosure relate to an engagement structure of a sub-frame for avoiding a collision between a battery and the sub-frame. Particular embodiments relate to an engagement structure of a sub-frame for avoiding a collision between a battery and the sub-frame, in which, when the sub-frame is pushed rearward during a collision of a vehicle, the sub-frame is moved to avoid the high voltage battery.

An embodiment of the present disclosure is directed to an engagement structure of a sub-frame for avoiding a collision between a battery and the sub-frame, in which, during a head-on collision, an offset collision, or a small overlap collision of an electric vehicle, in order to prevent the sub-frame from striking the battery, the sub-frame is pushed and inclined downward to be moved below the battery.

Other objects and advantages of embodiments of the present disclosure can be understood by the following description and become apparent with reference to the exemplary embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided an engagement structure of a sub-frame of a vehicle for avoiding a collision between a battery and the sub-frame, which includes a side member of a vehicle and a sub-frame engaged with the side member, the engagement structure including an engagement bracket of which an upper end is engaged with the side member and which is connected to a portion in which the side member is engaged with the sub-frame, and the engagement bracket includes an inclined portion formed to be inclined downward toward a rear side of the vehicle.

The inclined portion may be formed to be inclined downward toward the rear side of the vehicle from a member engagement portion in which the engagement bracket is seated on the sub-frame and through which a stud configured to engage the side member with the sub-frame passes.

A groove may be formed in the inclined portion to be stepped with the inclined portion in a length direction of the inclined portion.

The engagement structure may further include a sidewall formed to extend upward from both ends of the inclined portion and configured to support the inclined portion.

A reinforcement rib may be formed at the sidewall to protrude from the sidewall in a vertical direction of the vehicle.

A reinforcement pipe may be formed to extend from one side of the side member toward the inclined portion and may have a lower end bonded to the inclined portion.

The reinforcement pipe may be formed toward the front side of the vehicle from an upper end to a lower end.

A reinforcement plate may be formed toward the side member from a rear end of the inclined portion.

The rear end of the inclined portion may be disposed to be spaced apart from a front end of the battery disposed in a lower portion of the vehicle by a predetermined interval.

In addition, in accordance with another embodiment of the present disclosure, there is provided an engagement structure of a sub-frame for avoiding a collision between a battery and the sub-frame, which includes a side member of a vehicle and a sub-frame engaged with the side member, the engagement structure including an engagement bracket of which an upper end is engaged with the side member, which covers a portion in which the side member is engaged with the sub-frame, which is seated on the sub-frame, and in which a member engagement portion through which a stud configured to engage the side member with the sub-frame passes is formed, and an inclined portion formed to be inclined downward further from the member engagement portion than a front end of the battery disposed in a lower portion of a vehicle.

A rear end of the inclined portion may be disposed to be spaced apart from a front end of the battery by a predetermined interval.

DETAILED DESCRIPTION OF ILLUSTRATIVE EMBODIMENTS

Figure 1:
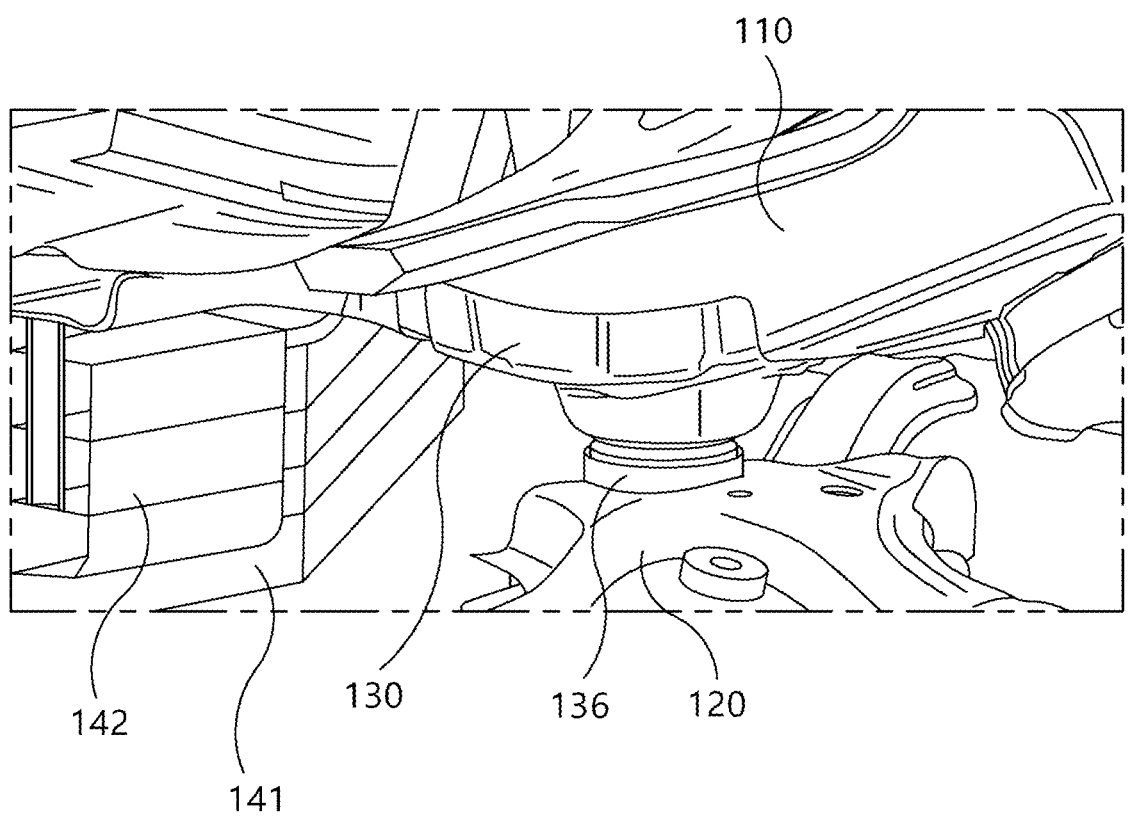
FIG. 1 is a perspective view illustrating a state in which a sub-frame is engaged with a vehicle body according to the related art.
Figure 2:
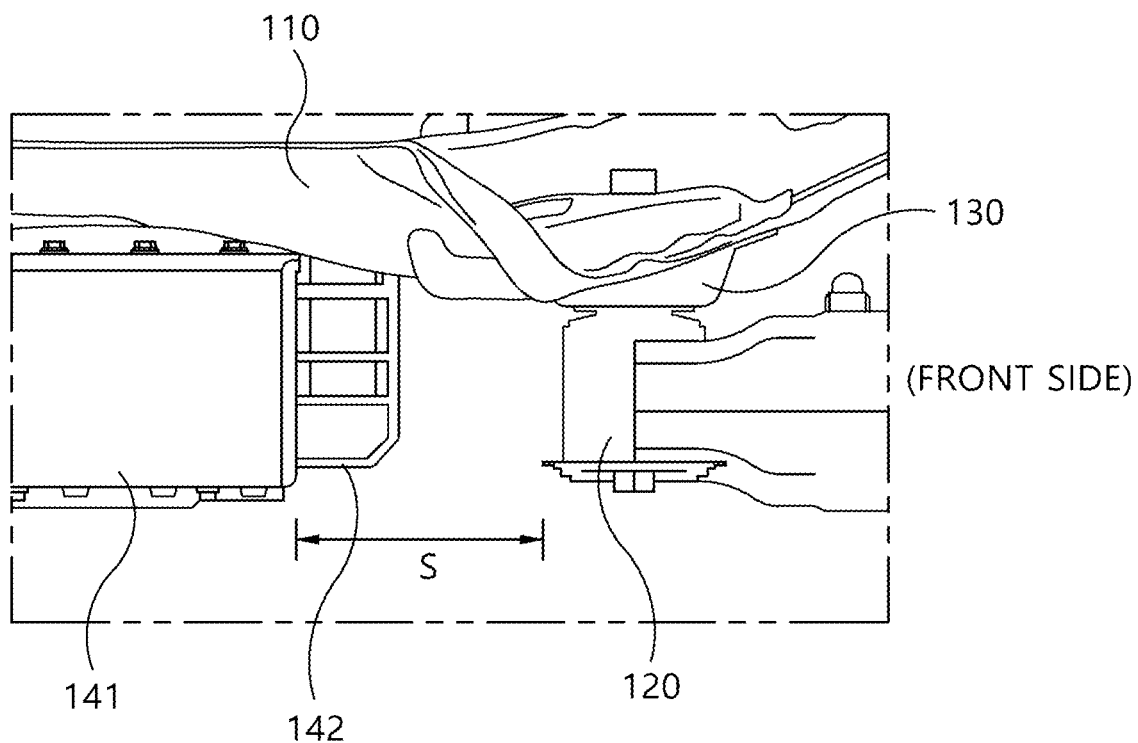
FIG. 2 is a side view illustrating the state in which the sub-frame is engaged with the vehicle body according to the related art.
Figure 3:
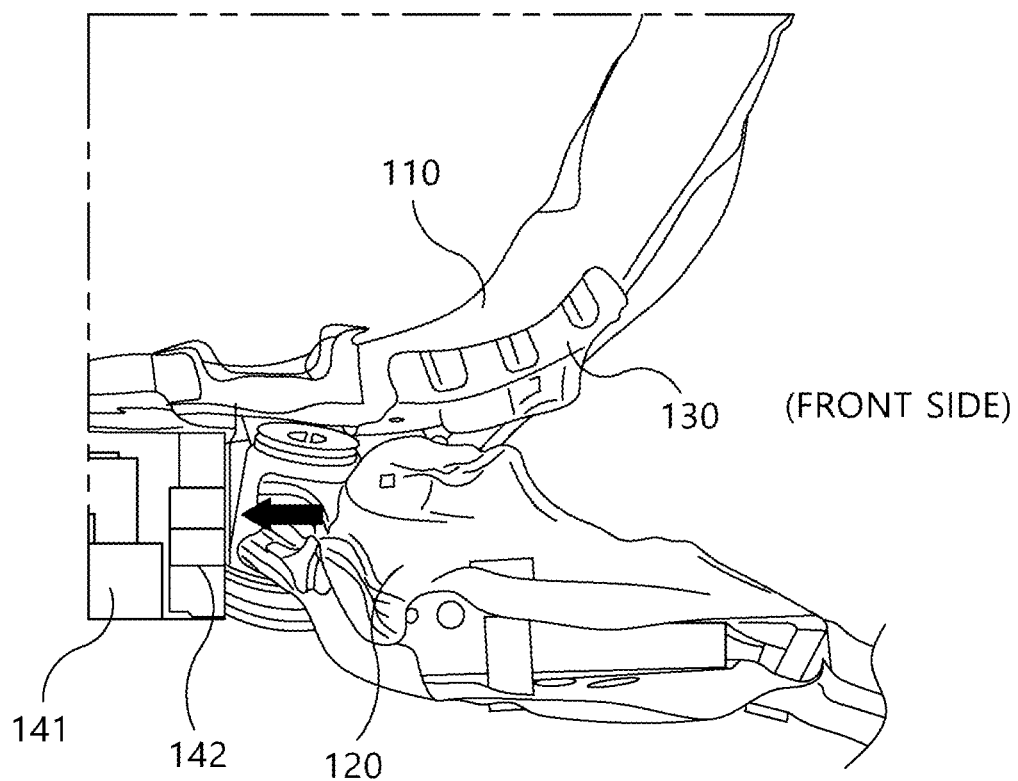
FIG. 3 is a side view illustrating a state in which the sub-frame strikes a battery during a collision according to the related art.
Figure 4:
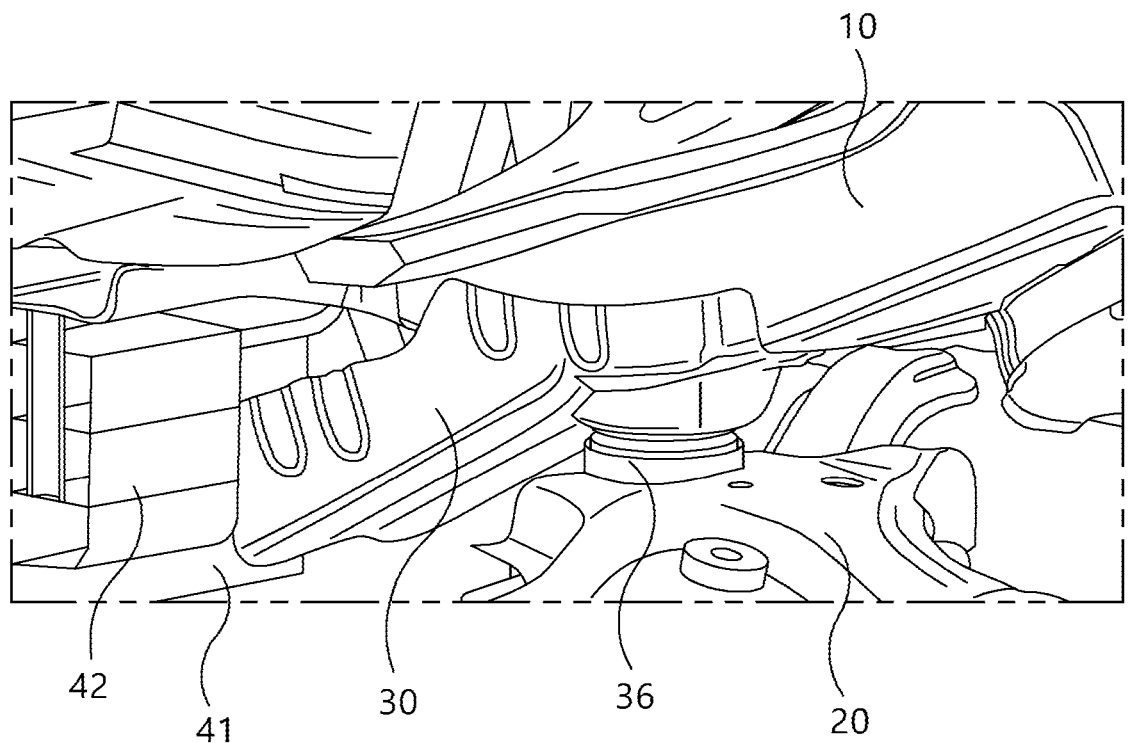
FIG. 4 is a perspective view illustrating an engagement structure of a sub-frame for avoiding a collision between a battery and the sub-frame according to embodiments of the present disclosure.
Figure 5:
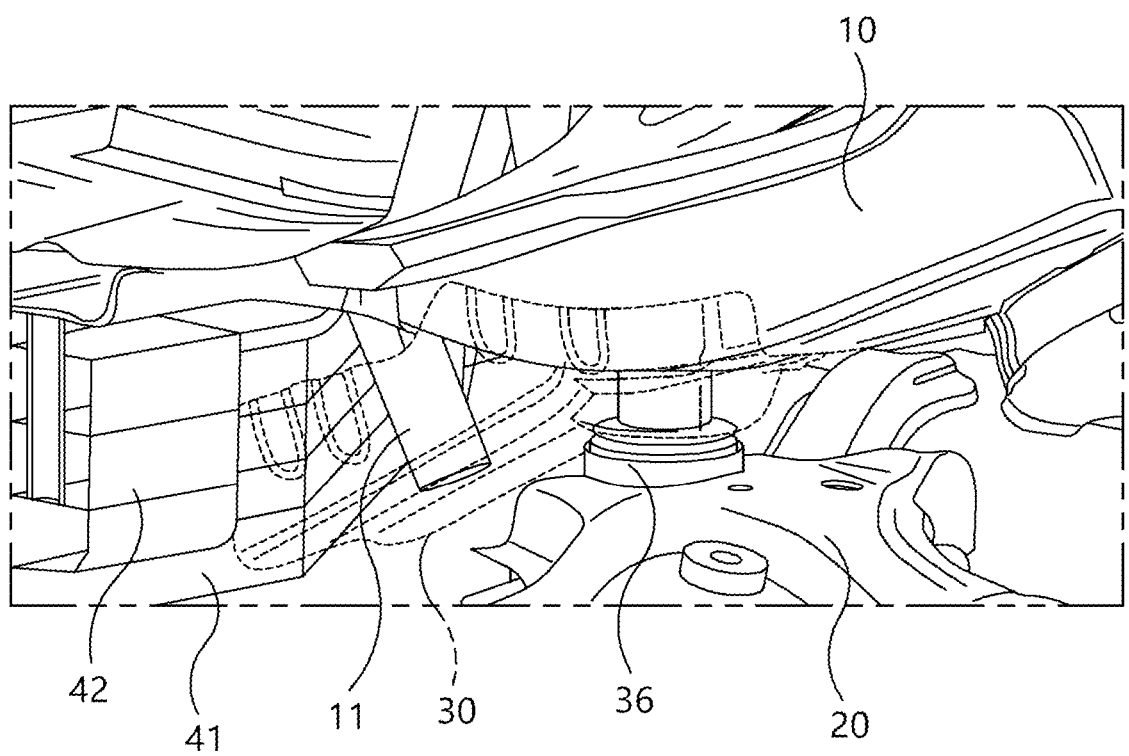
FIG. 5 is a perspective view illustrating a projected state of an engagement bracket in the engagement structure of a sub-frame for avoiding a collision between a battery and the sub-frame according to embodiments of the present disclosure.

Hereinafter, an engagement structure of a sub-frame for avoiding a collision between a battery and the sub-frame according to embodiments of the present disclosure will be described in detail with reference to the accompanying drawings.

As illustrated in FIGS. 4 to 10, the engagement structure of a sub-frame for avoiding a collision between a battery and the sub-frame according to embodiments of the present disclosure, which includes a side member 10 of a vehicle and a sub-frame 20 engaged with the side member 10, includes an engagement bracket 30 of which an upper end is engaged with the side member 10 and which is connected to a portion in which the side member 10 is engaged with the sub-frame 20. The engagement bracket 30 includes an inclined portion 31 formed to be inclined downward toward a rear side of the vehicle.

The side member 10 forms a frame on a side surface of a front side of the vehicle.

The sub-frame 20 is located in a lower portion of the front side of the vehicle, and a suspension of the vehicle is mounted on both ends of the sub-frame 20.

The side member 10 and the sub-frame 20 are integrally formed by welding a stud 36 to the side member 10, and a bolt passes through the sub-frame 20 to be engaged with the stud 36 so that the sub-frame 20 is engaged with the side member 10.

In order to improve ride & handling (R&H) performance and noise, vibration, and harshness (NVH) performance of the vehicle, a bush (not shown) is applied to a portion in which the side member 10 is engaged with the sub-frame 20.

The upper end of the engagement bracket 30 is engaged with the side member 10 by welding or bolting and covers the portion in which the side member 10 is engaged with the sub-frame 20. The engagement bracket 30 is in contact with the sub-frame 20 at a position spaced apart from the bottom surface of the side member 10 so that the portion in which the side member 10 is engaged with the sub-frame 20 is stably engaged.

In particular, according to embodiments of the present disclosure, the engagement bracket 30 extends rearward so that, during a collision such as a head-on collision, an offset collision, or a small overlap collision, the engagement bracket 30 prevents the sub-frame 20 from striking the battery 41 mounted on the vehicle.

In an electric vehicle, the battery 41 is widely disposed at a lower portion of the electric vehicle so as to supply power required for driving. During a collision of the electric vehicle, the sub-frame 20 is separated from the side member 10 and pushed rearward to strike the battery 41. In order to prevent the striking, when the sub-frame 20 is pushed rearward in the engagement bracket 30, the sub-frame 20 is also moved downward and thus the sub-frame 20 is prevented from striking the battery 41.

To this end, an inclined portion 31 configured to guide the sub-frame 20 to be moved downward when the sub-frame 20 is separated is formed in the engagement bracket 30.

The engagement bracket 30 is seated on the sub-frame 20, and a member engagement portion 33 through which the stud 36 for engaging the side member 10 with the sub-frame 20 passes is formed. The inclined portion 31 is formed to be inclined downward toward the rear side of the vehicle from the member engagement portion 33.

That is, the inclined portion 31 extends toward a ground in the rear side of the vehicle from the member engagement portion 33. In particular, the inclined portion 31 is formed to be inclined downward from the member engagement portion 33 more than a front end of the battery 41 disposed in the lower portion of the vehicle.

Figure 6:
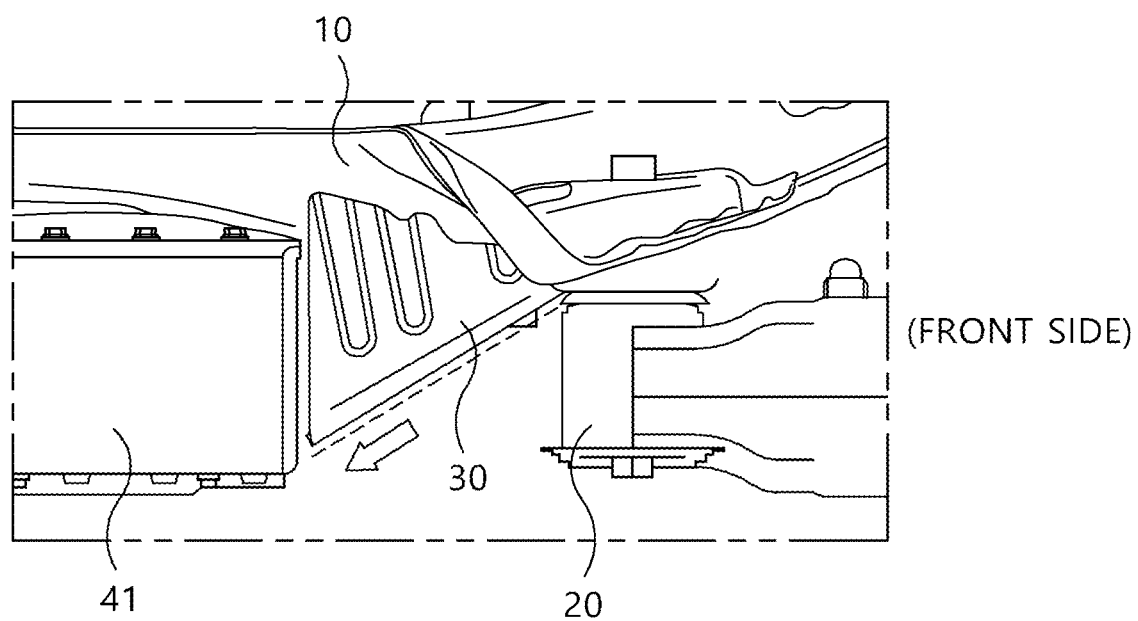
FIG. 6 is a side view illustrating the engagement structure of a sub-frame for avoiding a collision between a battery and the sub-frame according to embodiments of the present disclosure.
Figure 7:
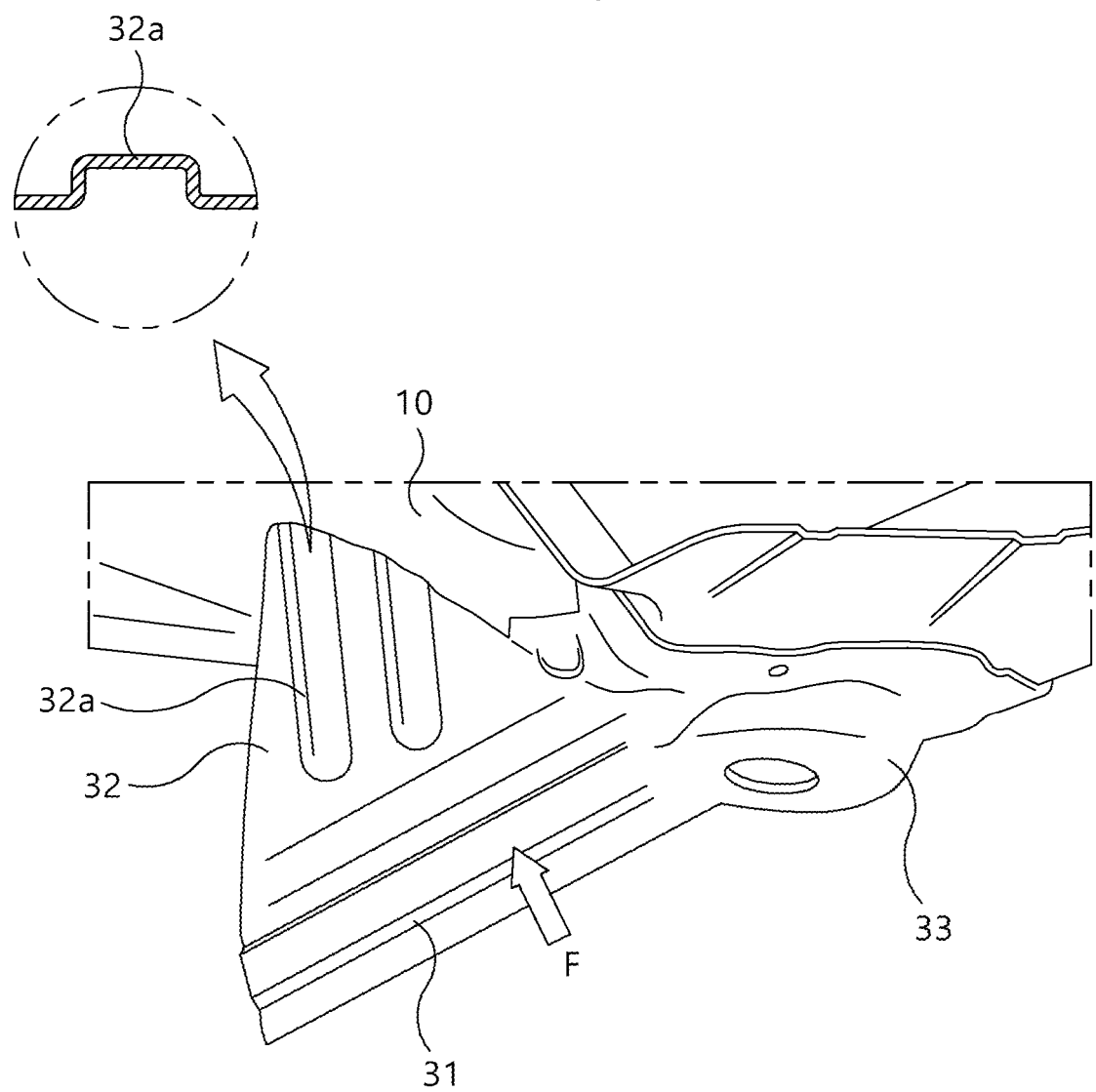
FIG. 7 is a perspective view illustrating one side of the engagement bracket in the engagement structure of a sub-frame for avoiding a collision between a battery and the sub-frame according to embodiments of the present disclosure.
Figure 8:
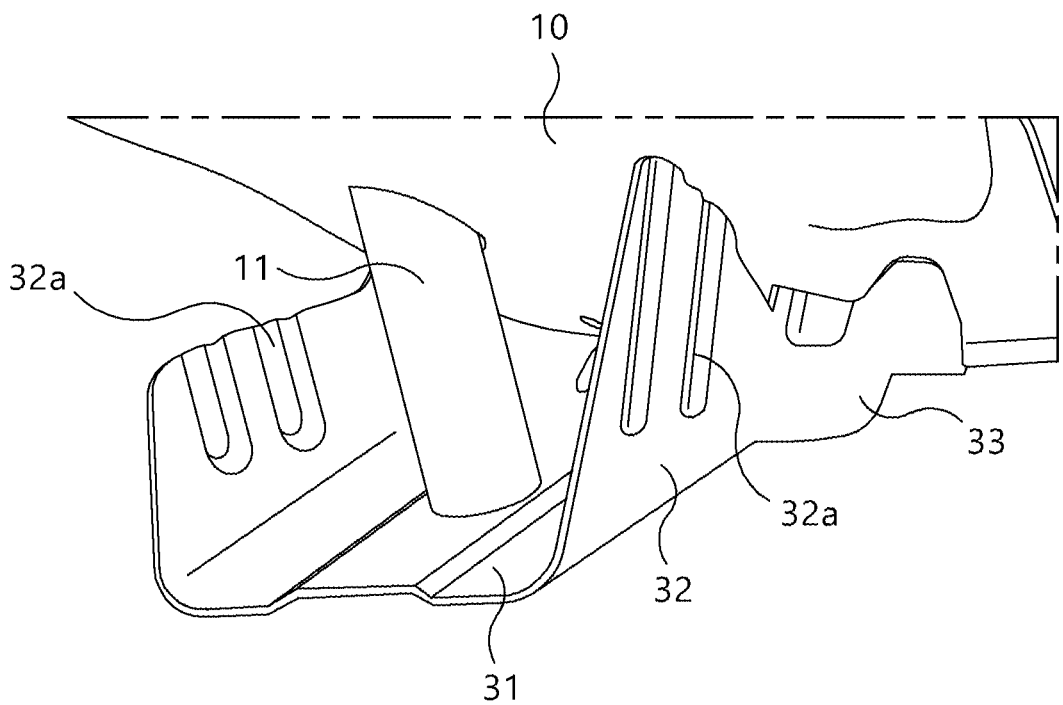
FIG. 8 is a perspective view illustrating a state in which a reinforcement pipe is applied between a side member and the engagement bracket in the engagement structure of a sub-frame for avoiding a collision between a battery and the sub-frame according to embodiments of the present disclosure.
Figure 9:
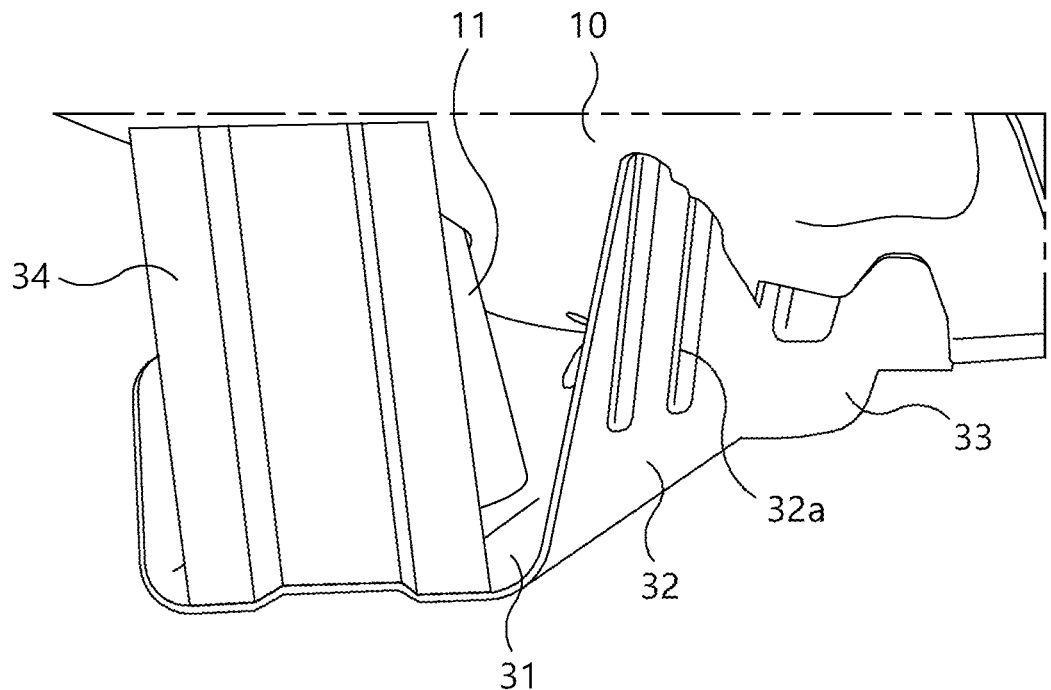
FIG. 9 is a perspective view illustrating a state in which a reinforcement plate is formed in the engagement bracket in the engagement structure of a sub-frame for avoiding a collision between a battery and the sub-frame according to embodiments of the present disclosure.
Figure 10:
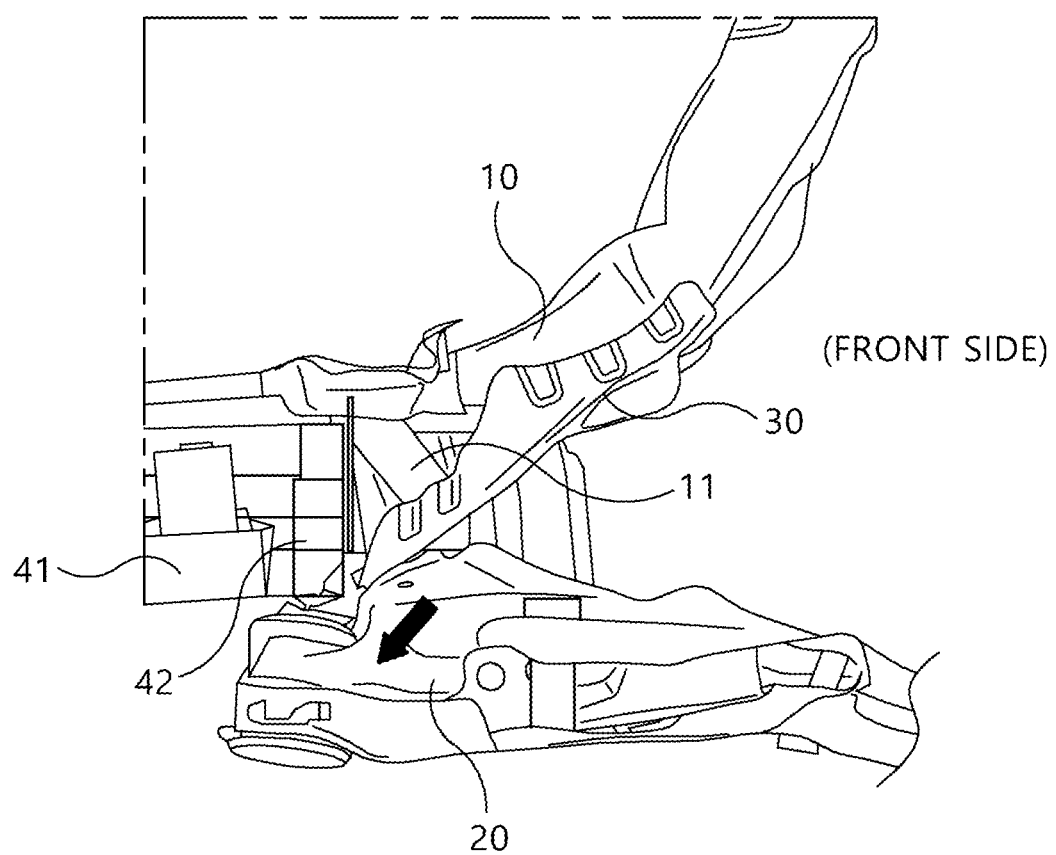
FIG. 10 is a side view illustrating a state in which the sub-frame is pushed due to a collision in the engagement structure of a sub-frame for avoiding a collision between a battery and the sub-frame according to embodiments of the present disclosure.

While the sub-frame 20 is separated and pushed rearward due to the inclined portion 31, the sub-frame 20 is moved downward along an inclined surface of the inclined portion 31. That is, as shown in FIG. 6, since the sub-frame 20 is moved downward along the inclined surface shown by a dotted line in an arrow direction, a phenomenon in which the sub-frame 20 strikes the battery 41 is prevented.

In order to improve stiffness of the inclined portion 31, a groove 31a is formed to be stepped with the inclined portion 31 in a length direction of the inclined portion 31. Since the stiffness of the inclined portion 31 is improved due to the groove 31a, when the sub-frame 20 is separated from the side member 10 and pushed rearward, the inclined portion 31 is prevented from being deformed.

In addition, sidewalls 32 are formed to extend upward from both ends of the inclined portion 31. Due to the sidewalls 32 together with the inclined portion 31, a cross section of the engagement bracket 30 is formed in a "U" shape so that the stiffness of the engagement bracket 30 is improved. Similarly, when the sub-frame 20 is separated from the side member 10 and pushed rearward, the sidewalls 32 also support the inclined portion 31.

Meanwhile, a reinforcement rib 32a is formed in the sidewall 32 to improve stiffness of the sidewall 32. The reinforcement rib 32a is formed to protrude from the sidewall 32 in a vertical direction of the vehicle, thereby improving the stiffness of the sidewall 32.

In addition, a reinforcement pipe 11 extending from one side of the side member 10 toward the inclined portion 31 is formed in the side member 10. The reinforcement pipe 11 is formed to be inclined downward toward a front end of the vehicle toward a lower end of the reinforcement pipe 11, and the lower end is bonded to the inclined portion 31, thereby supporting a load input to the inclined portion 31 during a collision. During the collision, loads due to the side member 10 and the sub-frame 20 are input in a direction of an arrow F of FIG. 7, and the reinforcement pipe 11 supports the loads to support the inclined portion 31.

In addition, a reinforcement plate 34 may be formed to extend upward from a rear end of the inclined portion 31 at the rear end thereof. Since the reinforcement plate 34 connects the rear end of the inclined portion 31 to the side member 10, the inclined portion 31 is supported by the reinforcement plate 34. The reinforcement plate 34 may be formed in the form of directly extending upward from the rear end of the inclined portion 31 toward the side member 10.

The rear end of the engagement bracket 30, that is, the rear end of the inclined portion 31, does not come into direct contact with the front end of the battery 41 and is disposed at a predetermined interval to prevent a phenomenon of load transfer through the direct contact. Referring to FIG. 6, it can be seen that a gap is formed between the rear end of the engagement bracket 30 and the front end of the battery 41.

As described above, when the sub-frame 20 is pushed rearward through the inclined portion 31, the sub-frame 20 is moved downward and prevented from striking the battery 41. In addition, since the sidewalls 32, the reinforcement pipe 11, or the reinforcement plate 34 supports the inclined portion 31, the inclined portion 31 is not deformed and the sub-frame 20 is moved downward without the striking of the battery 41.

According to the above structure, when the sub-frame 20 is separated from the side member 10 during a collision, since the sub-frame 20 is pushed rearward and moved downward along the inclined portion 31, the sub-frame 20 is moved from the front end of the battery 41 below the battery 41 (see FIG. 10) so that the sub-frame 20 does not strike the battery 41.

As described above, since the sub-frame 20 does not strike the battery 41, the protector for protecting the battery 41 is not necessary to install in the portion in which the engagement bracket 30 is installed at the front end of the battery 41, and the protector 42 is only installed in a portion in which the engagement bracket 30 is not present.

According to an engagement structure of a sub-frame for avoiding a collision between a battery and the sub-frame, during a collision of a vehicle, since the sub-frame is moved to be inclined downward and rearward due to an inclined surface of an engagement bracket, the sub-frame does not strike the battery.

As described above, since the sub-frame does not strike the battery during the collision, it is not necessary to secure a protector or a space for avoiding a collision between a front end of the battery and the sub-frame so that a capacity of the battery can be increased.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An engagement structure comprising:
an engagement bracket comprising an upper end configured to be engaged with a side member of a vehicle and connectable to a region in which the side member is to be engaged with a sub-frame, wherein the engagement bracket comprises an inclined portion inclined downward toward a rear side of the vehicle; and
a reinforcement pipe extending from the inclined portion towards one side of the side member and having a lower end bonded to the inclined portion.

2. The engagement structure of claim 1, further comprising a member engagement portion in which the engagement bracket is seatable on the sub-frame and through which a stud configured to engage the side member with the sub-frame passes, wherein the inclined portion is inclined downward toward the rear side of the vehicle from the member engagement portion.

3. The engagement structure of claim 1, further comprising a groove forming a step feature in a length direction of the inclined portion.

4. The engagement structure of claim 1, further comprising a sidewall extending upward from both ends of the inclined portion and supporting the inclined portion.

5. The engagement structure of claim 4, further comprising a reinforcement rib formed at the sidewall to protrude from the sidewall in a vertical direction of the vehicle.

6. The engagement structure of claim 1, wherein the reinforcement pipe is formed toward a front side of the vehicle from an upper end to a lower end.

7. The engagement structure of claim 1, further comprising a reinforcement plate formed toward the side member from a rear end of the inclined portion.

8. The engagement structure of claim 1, wherein a rear end of the inclined portion is disposed to be spaced apart by a predetermined interval from a front end of a battery disposed in a lower portion of the vehicle.

9. An engagement structure comprising:
a sub-frame engaged with a side member of a vehicle;
an engagement bracket including an upper end engaged with the side member, wherein the engagement bracket covers a region in which the side member is engaged with the sub-frame, is seated on the sub-frame, and comprises a member engagement portion through which a stud configured to engage the side member with the sub-frame passes; and an inclined portion inclined downward from the member engagement portion further than a front end of a battery disposed in a lower portion of the vehicle,
wherein a rear end of the inclined portion is disposed to be spaced apart by a predetermined gap from the front end of the battery.

10. A vehicle comprising:
a vehicle body comprising a side member, the side member defining a frame on a side surface of a front side of the vehicle;
a sub-frame engaged with the side member of the vehicle body;
an engagement bracket comprising an upper end engaged with the side member and connected to a region in which the side member is engaged with the sub-frame, wherein the engagement bracket comprises an inclined portion inclined downward toward a rear side of the vehicle;
a battery disposed in a lower portion of the vehicle; and
a reinforcement plate formed towards the side member from a rear end of the inclined portion.

11. The vehicle of claim 10, further comprising a member engagement portion in which the engagement bracket is seated on the sub-frame and through which a stud configured to engage the side member with the sub-frame passes, wherein the inclined portion is inclined downward toward the rear side of the vehicle from the member engagement portion.

12. The vehicle of claim 10, further comprising a groove forming a step feature in a length direction of the inclined portion.

13. The vehicle of claim 10, further comprising a sidewall extending upward from both ends of the inclined portion and supporting the inclined portion.

14. The vehicle of claim 13, further comprising a reinforcement rib formed at the sidewall to protrude from the sidewall in a vertical direction of the vehicle.

15. The vehicle of claim 10, further comprising a reinforcement pipe extending from one side of the side member toward the inclined portion and having a lower end bonded to the inclined portion.

16. The vehicle of claim 15, wherein the reinforcement pipe is formed toward the front side of the vehicle from an upper end to a lower end.

17. The vehicle of claim 10, wherein the rear end of the inclined portion is spaced apart by a predetermined interval from a front end of the battery disposed in the lower portion of the vehicle.

18. The engagement structure of claim 9, wherein the inclined portion comprises a groove forming a step feature in a length direction of the inclined portion.

19. The engagement structure of claim 18, further comprising a sidewall extending upward from both ends of the inclined portion and supporting the inclined portion.

20. The engagement structure of claim 19, further comprising a reinforcement rib formed in the sidewall in a vertical direction of the vehicle.

* * * * *